Dec. 27, 1955     A. J. P. MARTIN     2,728,219
MEANS FOR MEASURING THE DENSITY OF A FLUID
Filed Aug. 25, 1954
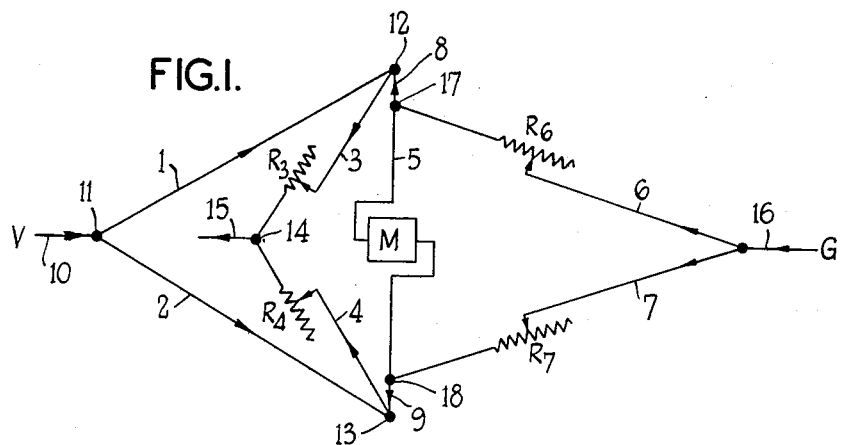
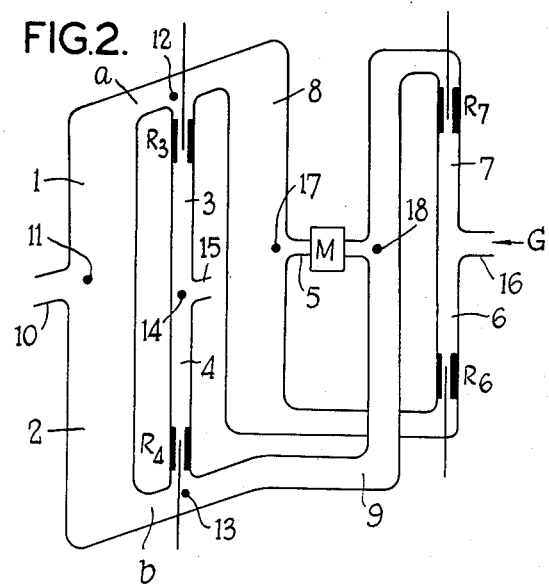
INVENTOR
ARCHER JOHN PORTER MARTIN
By Stevens, Davis, Miller & Mosher
Attorneys 2,728,219

MEANS FOR MEASURING THE DENSITY OF A FLUID

Archer John Porter Martin, Boreham Wood, England, assignor to National Research Development Corporation, London, England, a British corporation Application August 25, 1954, Serial No. 452,153

Claims priority, application Great Britain September 8, 1953

5 Claims. (Cl. 73—30)

The present invention provides a means for measuring the density of a fluid.

The measurement is achieved by comparing the density to be measured with that of known fluids and in order to simplify the description of the invention the fluid to be measured will be referred to herein as a vapour and the fluid with which it is compared will be referred to as a gas.

A preferred form of the invention will now be described with reference to the accompanying drawings, in which:

Figure 1 illustrates, in a purely diagrammatic way, the flow of fluid through what may be called a vapour density balance, and Figure 2 illustrates a balance of somewhat more practical form.

It is assumed that a series of vapours $V_1$, $V_2$, $V_3$ etc. of differing densities are to be passed in sequence through the balance and that the function of the balance is to detect when, and by how much, these densities change.

Referring to Figure 1, the apparatus here illustrated comprises a circuit for fluid consisting of nine limbs or arms arranged in the manner of a Wheatstone bridge, the nine limbs being indicated generally by the reference numbers 1 to 9 inclusive. During measurements the vapours V under test enter the balance at an inlet 10, divide at a junction 11 into two approximately equal streams and pass along the limbs 1 and 2 respectively to junctions 12 and 13. Thence the vapours pass through the limbs 3 and 4 to a junction 14 and out of the apparatus by way of an outlet 15.

The junctions 12 and 13 are connected by limbs 5, 8 and 9 and in limb 5 is a meter M of any known or suitable kind and which provides a record of the magnitude and direction of flow of any fluid through limb 5, or of the pressure difference between its ends.

A reference gas G, preferably of inert nature, enters the balance at 16, divides into two approximately equal streams which pass respectively along the limbs 6 and 7 of the bridge, to junctions 17 and 18 which, as will be seen, are located either between junction 12 and the meter, or between junction 13 and that instrument. Thence the gas passes through the limbs 8 and 9 to the junctions 12 and 13.

From the junctions 12 and 13 the mixtures of vapours and gases pass in two streams along the limbs 3 and 4 respectively to the outlet 15.

Flow resistances $R_3$, $R_4$, $R_6$ and $R_7$ are arranged in the limbs 3, 4, 6 and 7, respectively, for varying the resistance to flow through these limbs. Each resistance may consist, for example, of a rod cooperating with a constriction in the particular limb. The rod is passed through a sliding seal endwise into the limb and by varying the position of the rod with respect to the constriction the resistance to flow through the limb is varied.

Figure 2 shows how the circuits may be arranged in practice, like parts in the two figures bearing the same references. It will be seen that in Figure 2 the major part of each limb has been arranged to lie vertically while the remaining portions have been reduced to minimum length. In this way the device can be compressed into compact form.

Means are provided for maintaining the balance as a whole at substantially constant and uniform temperature.

The device is used in the following way:

Initially, and temporarily only, all the limbs are filled with reference gas G. The same gas is then admitted to the balance at constant rate of flow through the inlet 10 whilst inlet 16 is temporarily plugged. The gas divides into the two streams 1 and 21 which are approximately of equal rates of flow. The resistances $R_3$ and $R_4$ in the limbs 3 and 4 are then adjusted so that no flow is recorded in the instrument M.

Reference gas is then also admitted to the balance through inlet 16, the resistances $R_6$ and $R_7$ in the limbs 6 and 7 are adjusted so that again no flow is recorded in the instrument M. It follows that the pressures on either side of the instrument M must be equal.

The first vapour $V_1$ under test is then admitted at inlet 10. If its density is higher than that of the reference gas, the pressure difference between the vertically displaced junctions 12 and 13 increases owing to the increased weight of vapour in the limbs 1 and 2.

Therefore, since the density of gas in the limbs 8 and 9 remains unchanged, a pressure difference exists on either side of, and is recorded by, the instrument M.

The passages containing the resistances are of smaller section than the remaining ones, in order to give maximum sensitivity.

The instrument M may be of any known or suitable kind. For example, it may be a flow-meter of the kind described in United States patent application Serial No. 449,845.

The flow-meter is in effect functioning as a pressure-measuring device, and any suitable pressure gauge may be used in place of the flow-meter.

The vapours V are often of explosive or thermolabile nature and the instrument M may include a hot body. For these reasons the reference gas G is preferably of an inert nature, for example it may be nitrogen, in which case it serves the useful purpose of preventing the vapours or gases V from reaching the instrument M.

Referring to Figure 2, the portions $a$ and $b$ of the limbs 1 and 2 adjacent the junctions 12 and 13 are each made to slope upwardly so that if a sharp pulse of relatively heavy vapour occurs in the limb 1, the heavy vapour is prevented from spilling over into limb 8; conversely the lighter reference gas from limb 9 cannot enter the limb 2.

In order that a transient increase or decrease in pressure at the outlet 15 shall not cause a transient flow through the limb 5 or a transient pressure difference between its ends, it is desirable that the volumes of limbs 1, 8 and 6 shall be in sum approximately equal to the volumes of limbs 2, 9 and 7.

Although in this description it has been assumed that the reference medium is a gas and the medium under test is a vapour, either might be a gas or vapour, or both liquids.

What I claim is:

1. Apparatus for measuring the density of a fluid, comprising seven communicating passages or limbs for fluid arranged in the manner of a Wheatstone bridge, the first four limbs being connected as the balancing limbs of the bridge, an adjustable flow-resistance in at least one of the balancing limbs, an inlet for fluid to be measured at the junction of the first and second limbs, an outlet at the opposite junction, the junction of the first and third limbs being vertically displaced from its opposite junction, a fifth limb connecting the vertically displaced junctions, a pressure gauge in the fifth limb, a sixth limb connected at one end to an inlet for reference gas and at its other end to the fifth limb between the pressure gauge and one of the vertically displaced junctions, a seventh limb connected at one end to the said inlet for reference gas and at its other end to the fifth limb between the pressure gauge and the other of the vertically displaced junctions, and an adjustable flow-resistance in at least one of the sixth and seventh limbs.

2. Apparatus as claimed in claim 1, wherein the first and second limbs approach the vertically displaced junctions in an upward direction.

3. Apparatus as claimed in claim 1, wherein the resistance to flow offered by the first and second limbs is less than that offered by the third and fourth limbs.

4. Apparatus as claimed in claim 1, wherein the resistances to flow offered by the limbs containing the resistances is greater than that offered by the remaining limbs.

5. Apparatus as claimed in claim 1, wherein the sum of the volumes of the first and sixth limbs is in sum approximately equal to that of the second and seventh limbs.

References Cited in the file of this patent

UNITED STATES PATENTS

| | | |
|---|---|---|
| 1,506,617 | Dommer | Aug. 26, 1921 |
| 2,263,335 | Heinz | Nov. 18, 1941 |
| 2,449,067 | Guillemin | Sept. 14, 1948 |
| 2,589,251 | Heinz | Mar. 18, 1952 |